Inventor
HERBERT S. INDGE
By Harold W. Eaton
Attorney

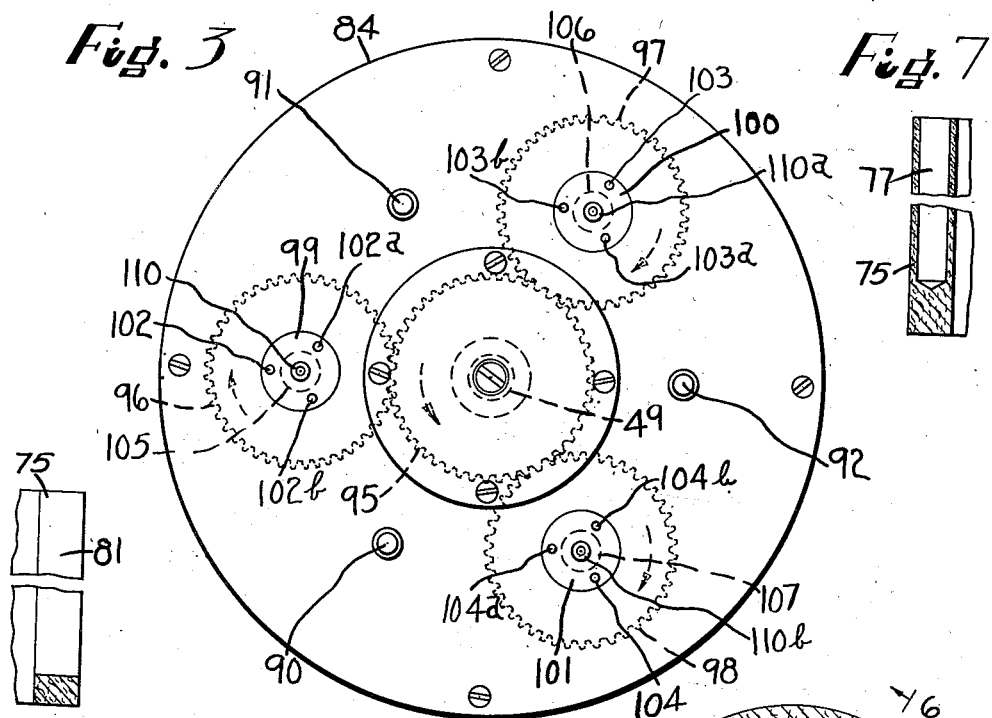
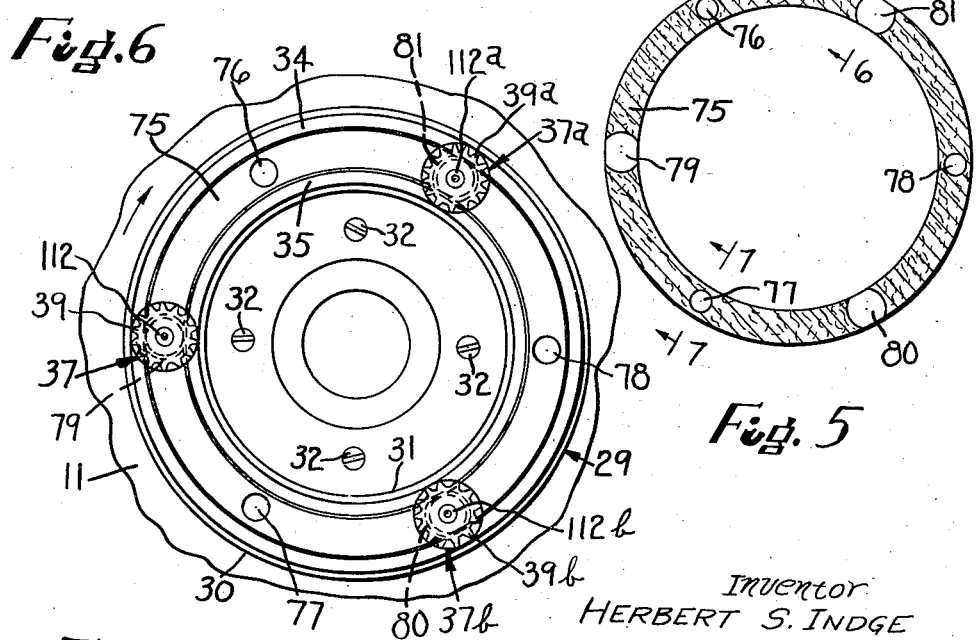

Patented Jan. 1, 1952

2,581,106

UNITED STATES PATENT OFFICE 2,581,106

LAPPING MACHINE

Herbert S. Indge, Westboro, Mass., assignor to Norton Company, Worcester, Mass., a corporation of Massachusetts Application December 26, 1950, Serial No. 202,730

5 Claims. (Cl. 51—131)

1

The invention relates to lapping machines and more particularly to a lapping machine for lapping a plane shouldered surface on a workpiece.

One object of the invention is to provide a simple and thoroughly practical lapping machine for simultaneously lapping a plane shouldered surface adjacent to a cylindrical portion on a plurality of workpieces. Another object is to provide a lapping machine with a pair of spaced rotatable concentric plane-faced lapping annuli and a work retaining cage therebetween for simultaneously lapping a shouldered face on a plurality of workpieces. Another object of the invention is to provide a lapping machine having a pair of spaced concentric plane-faced lapping annuli and a work retaining cage therebetween in which the work cage and lapping annuli are relatively rotated during a simultaneous rotation of a plurality of workpieces for lapping shouldered faces thereon. Other objects will be in part obvious or in part pointed out hereinafter.

The invention accordingly consists in the features of construction, and arrangements of parts, as will be exemplified in the structure to be hereinafter described, and the scope of the application of which will be indicated in the following claims.

In the accompanying drawings, in which is shown one of the various embodiments of the mechanical features of this invention, Fig. 1 is a vertical sectional view, through the improved lapping machine;

Fig. 3 is a bottom plan view, on an enlarged scale, taken approximately on the line 3—3 of Fig. 1, of the work driving head;

Fig. 4 is a plan view, on an enlarged scale, taken approximately on the line 4—4 of Fig. 1, showing the arrangement of the lapping wheel, the work retainer cage and the workpieces;

Fig. 5 is a horizontal sectional view, on a reduced scale, taken approximately on the line 5—5 of Fig. 2, through the work cage with the lapping elements removed;

Fig. 6 is a fragmentary sectional view, on a slightly enlarged scale, taken approximately on the line 6—6 of Fig. 5, through the work retainer cage; and Fig. 7 is a fragmentary sectional view, on a slightly enlarged scale, taken approximately on the line 7—7 of Fig. 5, through the work retainer cage.

Figure 1:
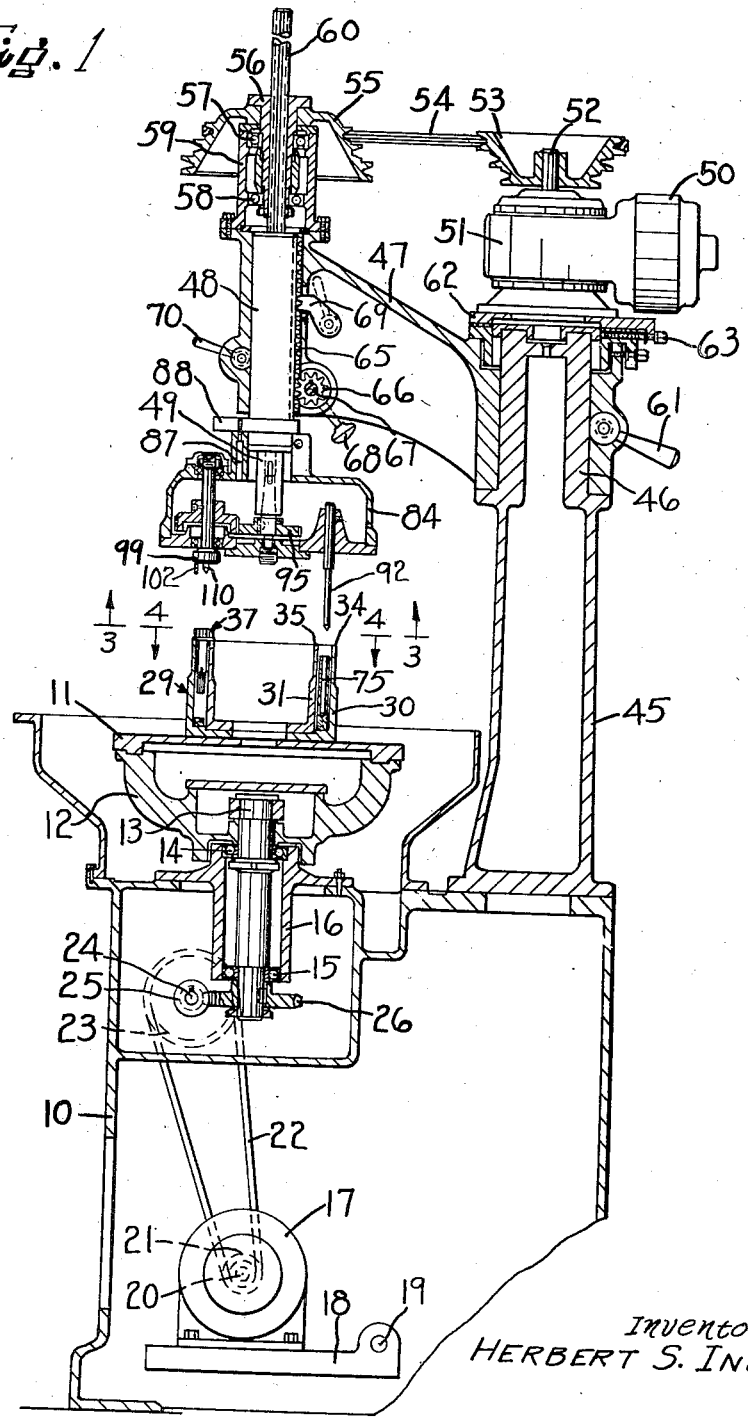

The lapping machine has been illustrated in the drawings comprising a base 10 which serves as a support for a rotary platen 11. The platen 11 is supported by a spider 12 on the upper end of a rotatable shaft 13. The shaft 13 is supported by a pair of spaced anti-friction bearings 14 and 15 which are in turn supported by a housing 16 which is fixedly mounted on the base 10.

A suitable driving mechanism is provided for the platen 11 comprising an electric motor 17 which is supported on a pivotally mounted supporting plate 18. The plate 18 is supported on a rock shaft 19 which is in turn supported by the base 10. The motor 17 is provided with a motor shaft 20 having a pulley 21 which is connected by a V-belt 22. The V-belt 22 drives a pulley 23 mounted on a rotatable shaft 24. The shaft 24 is provided with a worm 25 which meshes with a worm gear 26 mounted on the lower end of the shaft 13. It will be readily apparent from the foregoing disclosure that rotation of the motor shaft 20 will be imparted through the driving mechanism above described to rotate the platen 11. The weight of the motor 17 and the supporting plate 18 may as illustrated be utilized to provide the proper driving tension for the V-belt 22.

The platen 11 serves as a support for a lapping wheel 29 which as illustrated may comprise a pair of cup-shaped laps 30 and 31 which are fastened together and onto the platen 11 by means of a plurality of screws 32. The laps 30 and 31 are provided with a pair of spaced, plane-faced, concentric lapping surfaces 34 and 35 for lapping a shouldered face 36 on a plurality of workpieces 37. The shouldered faces 36 are formed adjacent to a cylindrical portion 38. A pinion 39 is formed integrally with the cylindrical portion 38. A space 40 formed between the cup-shaped laps 30 and 31 being sufficient to allow the cylindrical portions 38 of the workpiece 37 to move freely therein.

The base 10 also serves as a support for a vertically arranged column 45 having a vertical cylindrical surface 46 adjacent to its upper end which serves as a support for a horizontally extending arm 47. The arm 47 is provided with a vertically arranged cylindrical aperture to support a slidably mounted quill 48. The quill 48 contains a pair of spaced bearings (not shown) for supporting a work driving spindle 49.

A driving mechanism is provided for the spindle 49 comprising an electric motor 50 having an integral speed reducer unit 51 for rotating a vertically arranged shaft 52 at a relatively low speed. The shaft 52 is provided with a stepped V-groove pulley 53 which is connected by a V-belt 54 with a stepped V-groove pulley 55. The pulley 55 is fixedly mounted on a rotatable sleeve 56. The sleeve 56 is supported by a pair of spaced anti-friction bearings 57 and 58 which are fixedly mounted within a housing 59. The housing 59 is fixedly mounted on the upper face of the arm 47. A binder screw 61 is provided for clamping the arm 47 in an adjusted position. The spindle 49 is provided with an upper extending portion 60 which is slidably keyed within the sleeve 56.

The motor 50 and speed reducer unit 51 are preferably supported on a transversely adjustable plate 62 on the upper end of the column 45. An adjusted screw 63 is provided to facilitate a transverse adjustment of the plate 62, the motor 50 and speed reducer 51 to facilitate adjustment of the tension of the V-belt 54. The arm 47 may be readily adjusted so that the axis of the spindle 49 is in axial alignment with the shaft 13, or if desired the arm 47 may be swung to an inoperative position to facilitate setting up the machine.

A suitable mechanism is provided to facilitate raising and lowering the quill 48. As illustrated in Fig. 1, the quill 48 is provided with a rack bar 65. A pinion 66 keyed on a rock shaft 67 meshes with the rack bar 65. An actuating handle 68 is fixedly mounted on the rock shaft 67 by means of which the gear 66 may be readily rotated to complete an upward or downward movement of the quill 48. A locking pawl 69 is pivotally mounted on the arm 47 and is provided adjacent to its upper end with teeth to mesh with the teeth on the rack bar 65. The locking pawl 69 serves to lock the quill 48 in an uppermost or inoperative position. A binder screw 70 is provided to facilitate locking the quill 48 in adjusted position relative to the arm 47.

A work retaining cage 75 is formed as an annulus, the thickness of which is slightly less than the space 40 between the laps 30 and 31. The retainer cage 75 is preferably made of a Micarta tubing which is held stationary between the laps 30 and 31 during a lapping operation in a manner to be hereinafter described. The retainer cage 75 is provided with a plurality of symmetrically arranged holes 76, 77 and 78 which serve in a manner to be hereinafter described to hold the cage stationary during a lapping operation. The retainer cage 75 is also provided with a plurality of symmetrically arranged work receiving apertures 79, 80 and 81 which are arranged to hold a plurality of workpieces in a vertical position during a lapping operation.

A work driving head 84 is mounted on the lower end of the quill 48. The head 84 is provided with an internal cylindrical aperture 85 which mates with a cylindrical portion 86 formed on the lower end of the quill 48. A driving pin 87 connects the work driving head 84 with a flanged portion 88 on the quill 48. A binder screw 89 serves to clamp the head 84 in position on the cylindrical portion 86 of the quill 48.

The work driving head 84 is provided with a plurality of symmetrically arranged pins 90, 91 and 92 which are arranged so that when the work driving head 84 is lowered into an operative position, the pins 90, 91 and 92 will engage the holes 76, 77 and 78 in the retainer cake 75 to facilitate holding the cage 75 stationary during rotation of the laps 30 and 31.

Figure 2:
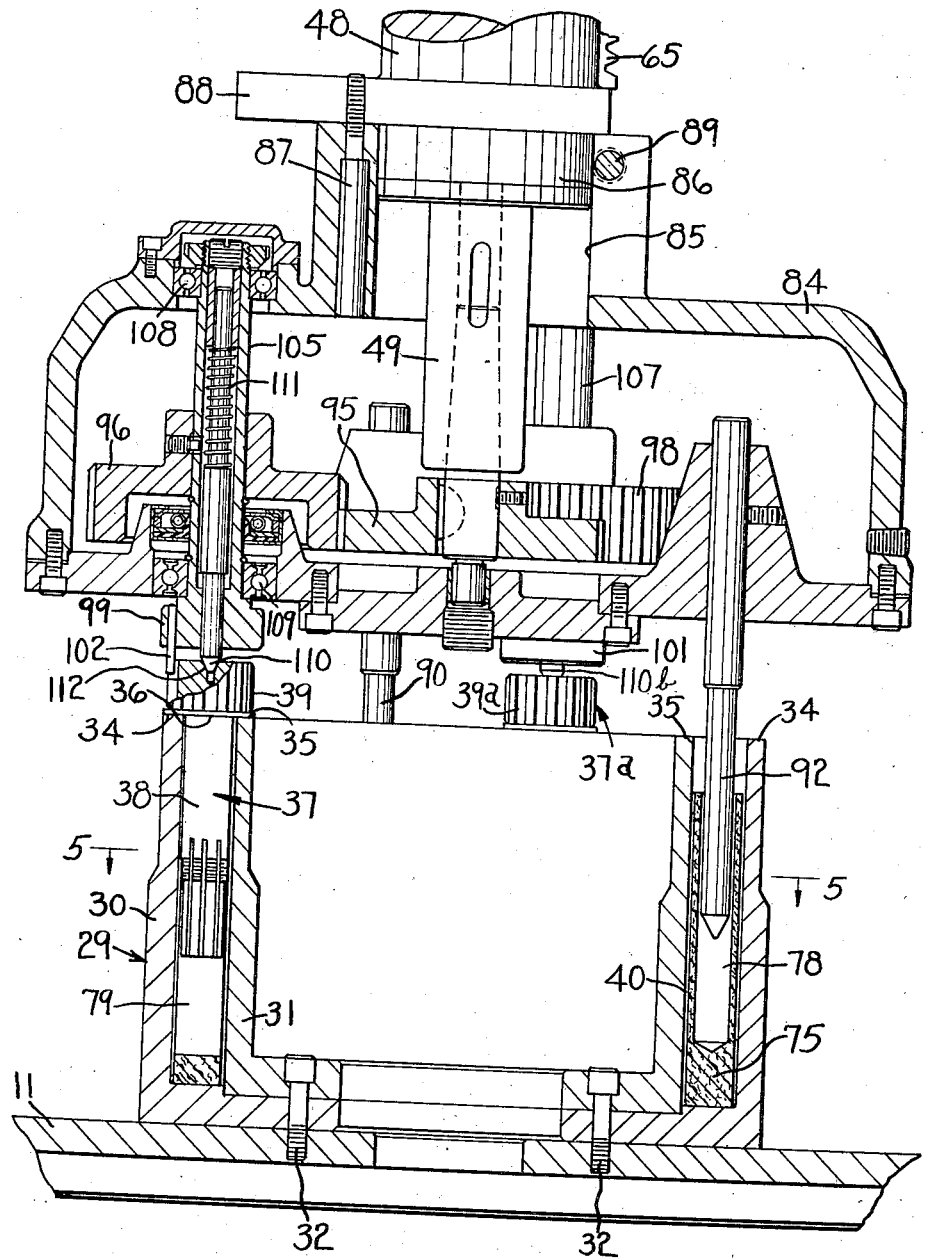
Fig. 2 is a vertical section, on an enlarged scale, through the work driving head, the work retainer cage and the lapping wheel.

The work driving head 84 also supports a plurality of work drivers for independently rotating a plurality of workpieces. As illustrative in Fig. 2, a gear 95 is mounted on the lower end of the spindle 49. The gear 95 meshes with a plurality of symmetrically arranged gears 96, 97 and 98, each of which is arranged to rotate a work driving head 99, 100 and 101 to drive the work driving pins 102, 103 and 104. As shown in Fig. 3, the work driving head 99, 100 and 101 may be provided with three symmetrically arranged driving pins 102—102a—102b, 103—103a—103b and 104—104a—104b, respectively.

The work driving heads 99, 100 and 101 are mounted on independently symmetrically arranged spindles 105, 106 and 107. These spindles 105, 106 and 107 and their associated parts are identical in construction, consequently only one of the assemblies has been illustrated in Fig. 2. The spindle 105 is supported on a pair of spaced anti-friction bearings 108 and 109. It will be readily apparent from the foregoing disclosure that rotary motion of the spindle 49 will be transmitted through the central gear 95 simultaneously to rotate the gears 96, 97 and 98 to drive the heads 99, 100 and 101. The driving pins 102, 103 and 104 are arranged to engage a peripheral portion of the workpiece so as to impart a rotary motion thereto during rotation of the lapping wheels 30 and 31 so as to produce a predetermined lapping operation on the shouldered face 36 of the workpiece 37.

In order to obtain the desired lapping action, a suitable pressure operated mechanism is provided for maintaining the workpiece in operative engagement with the faces of the laps 30 and 31 at a predetermined pressure. This is preferably accomplished by means of a spring pressed plunger 110 slidably mounted within a central aperture formed within the spindle 105. A compression spring 111 serves to exert a downward pressure on the conical end portion of the spindle 110 to maintain it in operative engagement with a center hole 112 formed in the upper face of the workpiece 37. The spindles 106 and 107 are similarly provided with spring pressed plungers (not shown) for maintaining the plungers 110a and 110b in operative engagement with the center holes formed in the upper faces of the workpieces 37a and 37b.

The operation of this improved lapping machine will be readily apparent from the foregoing disclosure. A plurality of workpieces 37, 37a and 37b are placed in position in the work receiving apertures 79, 80 and 81 formed in the work retainer cage 75. The cylindrical portions 38 of the workpiece 37 extend downwardly in the space 40 formed between the laps 30 and 31. The work driving head 84 is then lowered into an operative position by actuation of the lever 68 so that the pins 90, 91 and 92 move into engagement with the holes 77, 78 and 79 in the work retainer cage 75. During this downward movement of the work driving head 84, the spring pressed plungers 110, 110a and 110b move into operative engagement with the workpiece to exert a predetermined pressure between the workpiece and the lapping wheels 30 and 31. At the same time the work driving pins 102, 103 and 104 move into operative engagement with the workpiece. The electric motors 17 and 50 may then be started to rotate the lapping wheels 30 and 31 and also to impart a rotary motion to the workpieces 37, 37a and 37b to rotate the workpiece during the rotary motion of the lapping wheels 30 and 31 so as to produce a predetermined lapping operation on the shouldered face 36 on the workpieces 37, 37a and 37b. After the workpieces have been lapped to the desired and predetermined extent, the driving head 84 may then be moved to an inoperative position by actuation of the lever 68. When the lapping head reaches an uppermost or inoperative position the locking pawl 69 may be moved into engagement with the rack bar 65 to hold the driving head 84 and the quill 48 in an inoperative position to facilitate removal of the finish lapping workpieces from the retainer cage. The cage will then be reloaded and the cycle of operation repeated.

It will thus be seen that there has been provided by this invention, apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a lapping machine having a rotatable lapping wheel including spaced concentric plane-faced lapping annuli, means to rotate said lapping wheel, a work retainer cage between said annuli for simultaneously supporting a plurality of workpieces each having a shouldered face thereon in operative engagement with the operative faces of said annuli, means to hold said cage stationary, and a work driving head having a plurality of synchronously-rotated drivers each being arranged positively to rotate one of said workpieces.

2. In a lapping machine having a rotatable lapping wheel including a pair of spaced concentric plane-faced lapping annuli, means to rotate said lapping wheel, a work retainer cage between said annuli for simultaneously supporting a plurality of workpieces each having a shouldered face thereon in operative engagement with said annuli, means to hold said cage stationary, a work driving head, means to move said head to and from an operative position, a plurality of synchronously-rotated work drivers on said head each being arranged positively to rotate one of said workpieces, and a spring pressed plunger within each of said drivers to engage said workpiece to maintain them in lapping engagement with the lapping wheel at a desired pressure.

3. In a lapping machine having a rotatable lapping wheel including a pair of spaced concentric lapping annuli, means to rotate said lapping wheel, a work retainer cage between said annuli for simultaneously supporting a plurality of workpieces in a vertical position to facilitate lapping a shouldered face thereon, a work driving head, means to move said head to and from an operative position, a plurality of symmetrically-arranged pins on said head arranged to engage and to hold said cage against rotation, and a plurality of symmetrically-arranged synchronously-rotated work drivers on said head to engage and rotate a plurality of workpieces to be lapped.

4. In a lapping machine having a rotatable lapping wheel including a pair of concentric lapping annuli, means to rotate said lapping wheel, a work retainer cage between said annuli, a plurality of work receiving apertures therein for simultaneously supporting a plurality of workpieces in a vertical position to facilitate lapping a shouldered face thereon, a work driving head, means to move said head to and from an operative position, a plurality of symmetrically-arranged pins on said head, a plurality of holes in said cage which are engaged by said pins to hold said cage against rotation, a plurality of symmetrically-arranged synchronously-rotated work drivers on said head to engage and rotate a plurality of workpieces to be lapped, and means including a spring pressed plunger associated with each of said work drivers to engage a workpiece and maintain the workpiece in engagement with the lapping annuli at a desired pressure.

5. In a lapping machine having a rotatable lapping wheel including a pair of concentric lapping annuli, means to rotate said lapping wheel, a tubular-shaped work retainer cage between said annuli, a plurality of vertically arranged work receiving apertures therein for simultaneously supporting a plurality of workpieces in a vertical position to facilitate lapping a shouldered face thereon, a work driving head, means to move said head to and from an operative position, a plurality of vertically arranged driving pins on said head, a plurality of mating clearance holes in said cage which are engaged by said pins to hold said cage against rotation, a plurality of synchronously-rotated work drivers on said head to engage and rotate a plurality of workpieces during a lapping operation, and means including a spring pressed plunger associated with each of said work drivers to engage a workpiece and maintain the workpiece in engagement with the lapping annuli at a desired pressure.

HERBERT S. INDGE.

No references cited.